United States Patent [19]

Putz

[11] Patent Number: 5,593,636
[45] Date of Patent: Jan. 14, 1997

[54] METHOD FOR THERMAL CONTROL OF MACROFOULING

[76] Inventor: Frank L. Putz, 5 Ginger Meadow Ct., Glen Carbon, Ill. 62034

[21] Appl. No.: 454,430

[22] Filed: May 30, 1995

Related U.S. Application Data

[63] Continuation of Ser. No. 240,337, May 10, 1994, abandoned.

[51] Int. Cl.⁶ .............................. C02F 1/02; B08B 17/00
[52] U.S. Cl. .............................. 422/6; 422/38; 210/747; 210/774; 210/764
[58] Field of Search .............................. 422/6, 26, 38; 210/737, 747, 774, 153, 175, 764, 170; 165/134.1; 405/77, 78, 127; 137/334, 236.1

[56] References Cited

U.S. PATENT DOCUMENTS

| | | | |
|---|---|---|---|
| 4,997,547 | 3/1991 | Sarunac | 422/28 X |
| 5,240,674 | 8/1993 | Armor | 422/6 |
| 5,294,351 | 3/1994 | Clum et al. | 210/774 |
| 5,389,266 | 2/1995 | Clum et al. | 422/38 |

OTHER PUBLICATIONS

Putz; Heat Injection for Macrofouling Control in Water Intake Structures; Feb. 5, 1993; USPTO Disclosure Document No. 325647.

Stone & Webster Environmental Technology & Services / Electric Power Research Institute; Proceedings: Third International Zebra Mussel Conference, 1993; Jun. 1993; ,DD TR–102077.

McMahon, Ussery, Clarke; Use of Emersion as a Zebra Mussel Control Method; Jun. 1993; U. S. Army Corps of Engineers Waterways Experiment Station Contract Report EL–93–1.

Stone & Webster Engineering Corp. / Electric Power Research Institute; Symposium on Condenser Macrofouling Control Technologues: the State of the Art; Dec. 1983; SAYER CS–3343.

Evans, et al.; Options for Controlling Zebra Mussels; Ontario Hydro Research Review, Dec. 1992, No. 7, pp. 1–16.

Army Corps of Engineers, Waterways Experiment Station; Zebra Mussel Research Technical Notes; Jun. 1993.

Stone & Webster Environmental Services / Electric Power Research Institute; Zebra Mussel Monitoring and Control Guide; Dec. 1992; TR–101782.

Mackie, Gibbons, Muncaster, Gray; The Zebra Mussel, Dreissena Polymorpha: a Synthesis of European Experiences and a Preview for North America; Jul. 1989; ISBN 0–7729–5647–2.

Macrofouling Consultants; The Zebra Mussel: U.S. Utility Implications; Nov. 1990; POLYMORPH GS–6995.

*Primary Examiner*—Robert J. Warden
*Assistant Examiner*—Theresa T. Snider
*Attorney, Agent, or Firm*—Matthews & Associates, L.L.P.; Dwayne L. Mason

[57] ABSTRACT

A method for thermally treating fouling infestations of macroinvertebrates is disclosed. The inventive method includes treatments of both large structures in contact with relatively static masses of water and smaller structures, such as pipes, in contact with dynamic water masses and comprises the steps of heating the water in contact with the structure to be treated and maintaining an elevated temperature for a time sufficient to kill substantially all of the infesting organisms.

8 Claims, 1 Drawing Sheet

METHOD FOR THERMAL CONTROL OF MACROFOULING

This is a continuation of application Ser. No. 08/240,337 filed on May 10, 1994 now abandoned.

FIELD OF THE INVENTION

This invention concerns macrofouling by macroinvertebrates such as mollusks in water environments in general and more specifically in power plants.

BACKGROUND OF THE INVENTION

While the invention is applicable generally to macrofouling by macroinvertebrates of various types, it was developed in response to rapidly spreading infestations of zebra mussels, *Dreissena polymorpha*, and will be described with respect to its application to zebra mussels. The zebra mussel, which is native to Europe, was accidentally introduced into the United States Great Lakes in around 1985 or 1986. Since their introduction into the United States, zebra mussels have been found in the Hudson, Ohio, Susquehanna, Illinois, Mississippi and Tennessee Rivers and are expected to spread throughout the northern two-thirds of the United States. This area contains seventy percent (70%) of United States power plants.

The zebra mussel is of particular concern because of its fast rates of reproduction and growth, as well as its adaptability to changing environmental conditions, which allow it to flourish in water intakes and other related structures, thereby fouling them and rendering them ineffective or inoperative. More effective measures than those found in the prior art are therefore necessary to combat zebra mussel infestations.

Currently used methods of control fall generally into four categories: chemical; coatings; abrasive; thermal. Of these methods chemical controls are generally considered to be the most effective, both in performance and cost. Chemical methods include: continuous addition of chlorine or bromine; intermittent addition of bromine to kill veligers (the free-floating, planktonic, larval stage of the zebra mussel); various biocides; and chemical cleaners. The choice of one of the foregoing treatments depends on conditions and constraints of particular applications.

The coating of surfaces subject to zebra mussel infestation can be effective in controlling fouling. Various coating materials can be used in coating and may be used by itself or it may be used to increase the effectiveness of other methods with which it is used. Coatings, however, have several disadvantages: some materials may release elements into the water stream which are environmentally unsafe; coatings may be difficult to apply to equipment; and coatings generally require periodic inspection and reapplication.

Abrasive methods of macrofouling control can also be used. These methods include simple manual removal of mollusks, cleaning with high pressure water streams, and "sand blasting". The disadvantages of abrasive methods include: the need for protection of non-metallic surfaces such as expansion joints and valve seals; the extensive piping systems which are required for water jet cleaning; the labor-intensive nature of these methods; and the necessity of removing spent abrasive with methods such as "sand blasting".

Thermal treatments are also a well known method of controlling mollusk macrofouling. Thermal treatments include instantaneous and/or gradual increases in water temperature as well as direct application of steam to kill the mussels. Of these treatments, gradual increase of water temperature is the more commonly used method. This is generally effected by reversing the flow of water through a power plant so that heated water flows from the condenser to the water intake. This thermal backflushing has numerous disadvantages including: the necessity of a special plant design allowing reversal of the flow of water to increase intake water temperature; the expense of retrofitting plants which are not so designed; the difficulty of treating auxiliary systems (i.e. those other than the water intake systems); the increased wear on equipment due to the increased temperature of water at the intakes; the expense of shutting down plants which are not designed to reverse flow during operation; and the ability of zebra mussels to adapt rapidly to gradual changes in water temperature.

The disadvantages of prior art methods and apparati for thermal treatment of mollusk macrofouling are at least as well known as thermal treatment itself and have caused people in the field to dismiss the usefulness of this method of zebra mussel control. Numerous articles and authorities in the field mention thermal control in reviewing control options, but reject it as impracticable, cost ineffective or otherwise unworkable.

For example, Henk A. Jenner recognized in 1983 that "[t]o apply[ ] heat treatment[,] cooling water systems have to be designed specifically for this purpose." Henk A. Jenner, *Control of mussel fouling in the Netherlands: experimental and existing methods*, in SYMPOSIUM ON CONDENSER MACROFOULING CONTROL TECHNOLOGIES: THE STATE OF THE ART, 18–12 (Electric Power Research Institute, December 1983). The necessity of having a plant designed specifically to accommodate thermal treatment is echoed in numerous other references. Michael Khalanski, *Testing of five methods for the control of zebra mussels in cooling circuits of power plants located on the Moselle River*, in PROCEEDINGS: THIRD INTERNATIONAL ZEBRA MUSSEL CONFERENCE, 3–6 (Electric Power Research Institute, June 1993) ("Technical feasibility is the main problem, however, as it is extremely difficult to adapt heat treatment to systems not specifically designed for the purpose."); MACROFOULING CONSULTANTS, THE ZEBRA MUSSEL: ITS U.S. UTILITY IMPLICATIONS (1990) ("Use of this methodology may require expensive redesign and retrofitting in existing plants and could cause reduction in generating efficiency."). These technical difficulties are compounded by the fact that backflushing takes the cooling system out of service, thereby causing loss of service and adverse economic impact. ELECTRIC POWER RESEARCH INSTITUTE, ZEBRA MUSSEL MONITORING AND CONTROL GUIDE 7–68 (1992). Prior art methods of thermal treatment were thus considered infeasible or too costly to be implemented.

Writings in the field also describe the manner in which prior art thermal treatment of infestations can actually pose a threat to the water circulating systems which are being treated. Cooling water systems capable of thermal backflushing utilize their condensers to heat the cooling water and return it to the intake area. The condensers, however, are designed to operate with cool water flowing through them. The elevated temperature of the water flowing through the condensers can cause the thermal tolerances of vital equipment to be exceeded, possibly damaging the equipment. E. F. Neuhauser, et al., *Thermal treatment to control zebra mussels at the Dunkirk Steam Station*, in PROCEEDINGS: THIRD INTERNATIONAL ZEBRA MUSSEL CONFERENCE, 4–81 (Electric Power Research Institute, June 1993);

Joseph C. Petrille and Michael W. Werner, *A combined treatment approach using a non-oxidizing molluscicide and heat to control zebra mussels*, in PROCEEDINGS: THIRD INTERNATIONAL ZEBRA MUSSEL CONFERENCE, 3–206 (Electric Power Research Institute, June 1993). Therefore, some systems which are capable of thermal treatment by backflushing water through the condensers cannot be safely treated by this prior art method. Id.

OBJECTS OF THE INVENTION

It is an object of the invention to provide a cost effective method for treating mollusk infestations.

It is another object of the invention to provide a method for treating mollusk infestations which can be used to treat more than a single facility.

It is yet another object of the invention to provide a method for treating mollusk infestations which is environmentally benign.

It is yet another object of the invention to provide a method for treating mollusk infestations which does not place increased heat stress on the equipment of the facility being treated.

It is yet another object of the invention to provide a method for treating mollusk infestations which has increased effectiveness over prior art methods and apparati for killing infesting mollusks.

It is yet another object of the invention to provide a method for thermal treatment of mollusk infestations in facilities which have not been specifically designed for such treatments.

SUMMARY OF THE INVENTION

The present invention encompasses a method for the thermal treatment of macroinvertebrate infestations. Although the potential applications of the method are quite broad, the description of the method herein will deal primarily with those infestations occurring in the water intakes of power generation facilities. The inventive method contemplates the rapid elevation of the water temperature at the intakes and the maintenance of the elevated temperature for a period of time sufficient to ensure complete mortality of the infesting organisms.

The practice of the invention requires that the area to be treated be isolated from surrounding masses of water. (Although the water to be heated occupies a volume, the object of the treatment, e.g., an intake bay, will be referred to herein as an area.) The water in the isolated area is then heated to an elevated temperature which is typically about 35° C. This target temperature will vary depending on the ambient temperature of the water, the rapidity with which the temperature can be increased and the time for which the temperature can be maintained. When the target temperature is reached, it is typically maintained for an hour, though this also varies with the factors listed above. Generally speaking, the higher the elevated temperature, the shorter the time required to effectively treat the infested area.

The method can be practiced with an apparatus which generally comprises any portable means for heating large volumes of water. One of the simplest versions of this apparatus is a truck-mounted boiler. The boiler is used with a circulating tank eductor in order to use the steam from the boiler to directly heat the water. Of course, other types of equipment can be used to heat the water as long as they are sufficiently portable to be used to treat several areas or facilities and are not permanent fixtures.

DETAILED DESCRIPTION OF THE PREFERRED EMBODIMENT

Figure 2:
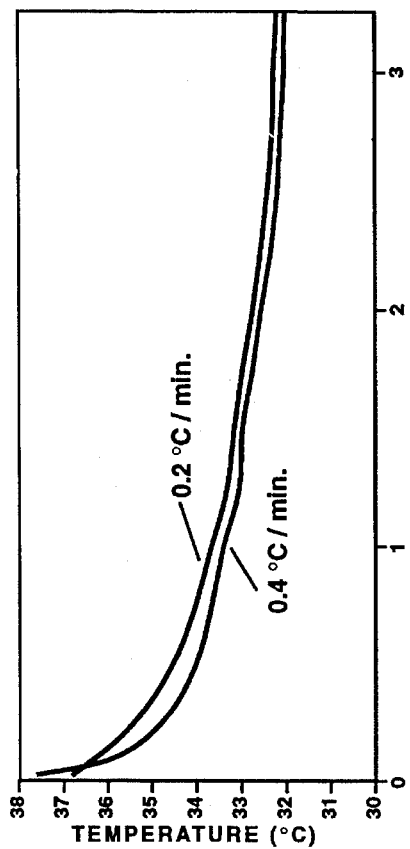
FIG. 2 is a graph of empirical data on the time and temperature which are required to achieve 100% mortality of zebra mussels when different rates of temperature increase are employed.

The preferred embodiment of the inventive method comprises the steps of: isolating the area to be treated; heating the water in the area to be treated until it reaches a target temperature (approximately 35° C.); maintaining this elevated temperature for a period sufficient to kill the mollusks (approximately one hour); and de-isolating the area after treatment and returning it to service.

The purpose of isolating the area to be treated is to limit the amount of water which has to be heated. This, of course, reduces the amount of energy which must be transferred to the water to elevate its temperature sufficiently quickly and by an amount great enough to ensure lethality. It is not necessary that the isolation be accomplished in any particular manner, as long as the treatment area does not have significant fluid communication with another body of water which would prevent a rapid increase to a lethal temperature. Although the inventive method will need to be adapted to each particular application because of the structural differences between the areas to be treated and the physical requirements for isolating these areas, the following description of the preferred embodiment will detail the invention as practiced on a power plant cooling water intake bay.

Normally, intake bays are designed to allow isolation of the bays by inserting or closing gates between adjacent bays, between the bay and the pump, and at the entrance to the bay. Some facilities may use valves or other mechanisms instead of gates, but these can be treated the same way as the gates. Typically, each generating unit is served by two intake pumps and each pump by an intake bay, so that one pump and bay is still available to the generating unit when the other is shut down for service or cleaning. Isolation of an intake bay for treatment is accomplished by inserting or closing the gates referenced above and is very simply and easily accomplished.

Further isolation of the treatment area may be achieved by placing a barrier between the water which actually touches the infesting organisms (the "contacting water") and the water which is not proximate to the infestation (the "non-contacting water"). The (the "non-contacting water") water acts as a thermal mass which slows the heating of the contacting water. By simply isolating the non-contacting water from the contacting water with a membrane or thin wall, the diffusion of the two water masses into each other is prevented and less heat is required to raise the temperature of the contacting water. This effect can be enhanced by making the wall or membrane out of an insulating material. Although the use of such a membrane has not been tested, it is contemplated that a bladder made of a material such as rubber and filled with the noncontacting water would adequately perform the function of this membrane.

After the area is isolated, the temperature of the water in the treatment area is heated until it reaches an elevated target temperature. While the target temperature is typically 35° C., it may be higher or lower, depending on the ambient temperature of the water, the rapidity with which the temperature can be increased and the time for which the temperature can be maintained.

Figure 1:
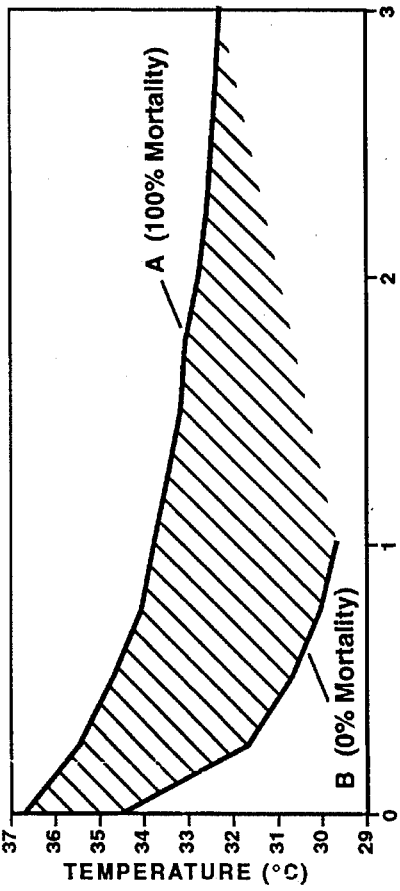
FIG. 1 is a graph of temperature versus time showing empirical data on the time and temperature which are required to achieve 0%–100% mortality of zebra mussels.

FIG. 1 shows the relationship between the target temperature and the length of time for which the target temperature must be maintained in order to ensure the mortality of an infestation of zebra mussels. The area above curve A defines combinations of time and temperature for which zebra mussel mortality has been found to be 100% (i.e., for which the inventive method is completely effective). The area below curve B defines combinations of time and temperature for which zebra mussel mortality has been found to be 0% (i.e., for which the inventive method is completely ineffective). The area between curves A and B define combinations of time and temperature for which zebra mussel mortality has been found to be greater than 0%, but less than 100% (i.e., for which the inventive method is somewhat effective, but not completely effective).

From FIG. 1, it can be seen that a temperature of 35° C. must be maintained for approximately 30 minutes in order to ensure complete mortality of the zebra mussel infestation. FIG. 1 also shows that a target temperature of 34° C. would have to be maintained for a period of approximately 1 hour to kill all of the zebra mussels in the treated area. The target temperature is therefore not defined as a single value, but as a range of values for which the maintenance of the target temperature for a given time will ensure that all of the zebra mussels are killed.

Figure 3:
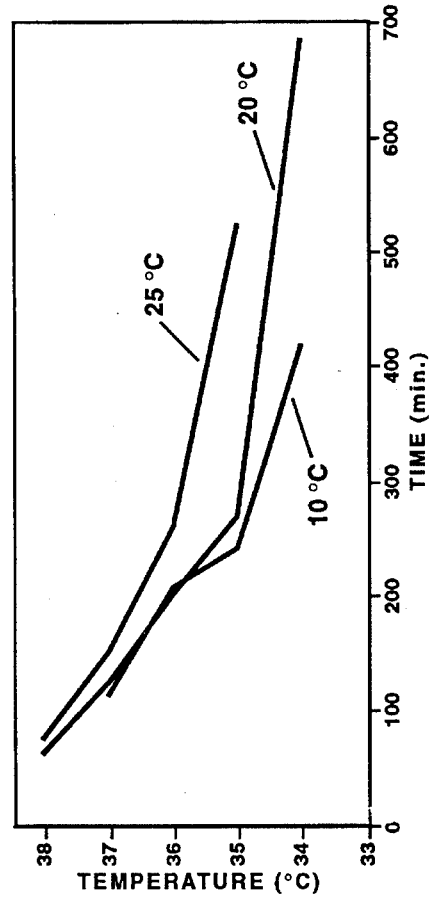
FIG. 3 is a graph of empirical data on the time and temperature which are required to achieve 100% mortality of zebra mussels when the mussels are aclimated to different ambient temperatures.

Similarly, the range of lethal time/temperature combinations shown in FIG. 1 are not constant for all situations, but may change with varying conditions, such as the rapidity with which the temperature can be increased during treatment, the initial ambient temperature of the water and the thermal tolerance of a particular mollusk population. FIG. 2 shows the manner in which the complete mortality curve (e.g., curve A in FIG. 1) varies with the rate of water temperature increase. FIG. 2 shows that, if the target temperature is reached more quickly, it does not have to be maintained for as great a period of time to guarantee that all of the zebra mussels are killed. FIG. 3 shows the manner in which the complete mortality curve varies with the initial ambient temperature of the water. FIG. 3 shows that the mortality of zebra mussels acclimated to higher temperatures requires either a higher target temperature, a longer time during which the target temperature is maintained, or both. FIG. 3 exemplifies the fact that the combinations of time and temperature necessary to ensure mortality of the mollusks depends on the conditions of each application and may vary considerably between applications.

The choice of a target temperature should also take into account the fact that 100% mortality is not required in order for the inventive method to be more effective (with respect to both the actual treatment and cost) than prior art methods of macrofouling control. This is mentioned because cost, portability or other factors may limit the heating capacity of the equipment used to elevate the water temperature in the practice of the inventive method. Although less than complete mortality may be an improvement over the prior art, the best results are achieved when the target temperature and time are selected such that the inventive method is practiced well within the 100% mortality range (i.e., time and temperature exceed the 100% mortality curve). By selecting such a target temperature and/or time, unexpected or unknown variations in the factors above will not shift the selected values into a range with less than complete mortality.

Once the target temperature is reached, the temperature is maintained for a period of time sufficient to ensure mortality of the infesting mollusks. This period is selected in combination with the target temperature as explained above and may vary with ambient water temperature, rate of heating and related factors in the same manner as the target temperature. Again, although less than 100% mortality may be more effective than prior art methods of control and is contemplated to be within the scope of the invention, the preferred embodiment of the inventive method contemplates a time/temperature combination which is greater than the minimum required for complete mortality.

Once the target temperature has been maintained for a period sufficient to kill the infesting zebra mussels, the heated water in the treated area may be discharged, mixed with other cooling system water, or diffused into surrounding waters. Since no chemical additives are used, the heated water is environmentally safe. Depending on the temperatures of the heated and ambient waters and the indigenous species of fish, however, the heated water may need to be gradually released in order to avoid harm to this wildlife.

As an alternative to simply releasing the heated water into the environment, it may instead be recycled by pumping it into another treatment area. This reuse of the heated water conserves substantial amounts of time, energy and expense while creating no additional (thermal) impact on the environment. The invention may also be practiced by using water from other above-ambient-temperature sources, such as de-icing lines or thermal discharge from the facility. The reduction of the volume of water in the treatment area to be heated (e.g., by partially draining the area) will also substantially reduce the consumption of energy and thereby increase the efficiency of the invention.

One embodiment of an apparatus which can be used to practice the invention consists of a truck-mounted boiler connected to a steam line and a circulating tank eductor. This embodiment was tested at the Rush Island Power Plant in Festus, Mo., on Jul. 1, 1993, to determine whether the water temperature in an intake well could be sufficiently raised and the method thereby practiced. The following detailed description relates to this particular embodiment.

The apparatus, which was designed specifically to meet the requirements of the Rush Island intake structure, used a 200 hp portable fuel oil boiler. The boiler was rated at 6900 pounds of steam per hour. A three-inch steam line was connected to the boiler and ran to the intake structure, approximately fifteen feet above the floor of the structure. A circulating tank eductor was connected to the line and was used to perform direct steam-to-water heating.

The test of the method was conducted when the river level at the plant was at flood stage, so the intake well contained approximately 450,000 gallons of water which were to be heated by the apparatus. A 20-degree elevation of the temperature of this water was calculated to require 78,600,000 Btu. Assuming an enthalpy of 1200 Btu per pound of steam and a 10.6% efficiency loss, the boiler should have been able to raise the water temperature 20 degrees in eleven hours.

Figure 4:
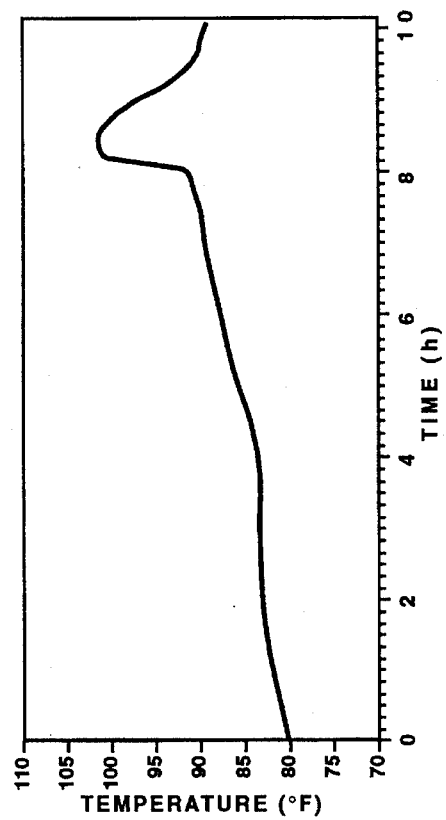
FIG. 4 is a graph of the time and temperature for a test of the inventive method at the Rush Island Power Plant.

The actual test of the apparatus demonstrated that the apparatus operated as expected and raised the water temperature enough to practice the inventive method. The temperature of the water in the intake well is shown in FIG. 4 as a function of time. FIG. 4 shows that the water temperature in the well was increased by more than 20 degrees in approximately 10 hours. An interruption in the test caused the heating of the water to be halted, resulting in the flat portion of the graph in FIG. 4. At the end of the test, a sudden increase in temperature is recorded, corresponding to what is believed to have been a rollover of two masses of water of different temperatures in the well. FIG. 4 nonetheless shows that a portable apparatus of the type used in the test is capable of practicing the inventive method.

In addition to the particular embodiment described above, many alternate embodiments are possible. Numerous modifications may be made to the apparatus, including the use of different types of boilers or heaters. These heaters can operate through steam eduction into the water, direct heating of the water, replacement of the water in the intake structure with preheated water, or other suitable means of raising the water temperature in the treatment area.

It should also be noted that the foregoing embodiments of the inventive method are useful in the treatment of static bodies of water in isolated treatment areas. These embodiments are not well suited to the treatment of other, dynamic water environments, such as service water systems. In these systems, heat treatment is still effective, but it has been difficult to implement.

For instance, some facilities which are capable of recirculating heated water through their cooling systems can also recirculate this heated water through service water systems. As pointed out above, a few facilities are specifically designed and constructed to allow thermal backflushing and some can also treat their service water systems with this procedure. Other facilities could be retrofitted to allow thermal backflushing, but this is a very expensive procedure. In some facilities, water can be heated in a storage tank and then flushed through service water systems. These methods of thermal treatment, however, can be difficult, time consuming, inefficient and often require that the facility be shut down during treatment. A method of heating service water in-line while a power plant is operating therefore has distinct advantages over the prior art.

Since the water in these systems is not confined to an area in which it can all be gradually heated, the water must be heated rapidly as it passes a point or series of points in the system. This can be accomplished with an inline jet pump or heater. This equipment can utilize steam, which is readily available at facilities such as power plants, to heat water passing through the pipes of the service water system being treated. Equipment which can provide sufficient heating for both smaller (less than 12-inch diameter) and larger (greater than 12-inch diameter) pipes is readily available, although the larger pipes may require multiple heating components arranged in series or in parallel. The particular equipment investigated in connection with the invention includes steam jet and steam ring heaters made by Penberthy, and steam injection heaters made by Pick Heaters Inc. While these heaters are suitable to practice the invention, any other suitable heater may be used.

Despite differences in the equipment used to implement the method, the same basic steps are used in the treatment of service water systems: heating the water in the area to be treated until it reaches a target temperature (approximately 35° C.); and maintaining this elevated temperature for a period sufficient to kill the mollusks (approximately one hour). The obvious distinction from the method as applied to large areas (e.g., intake bays) is the elimination of the steps of isolating the treatment area and then de-isolating it after treatment. These steps are not applied to the dynamic environments of service water systems because of the much smaller incremental volume of water to which the heat is apppplied and the sharp separation of the heated water downstream from the heater and the unheated water upstream.

The invention thus provides a method for controlling macrofouling in water environments more efficiently and cost-effectively than the prior art. Additionally, the invention provides a method of macrofouling control which is an improvement in the following respects: it is environmentaly safe; it causes less heat stress on the equipment of the facility being treated than the prior art; facilities which were not originally designed to use thermal treatment for macrofouling control can now perform such treatment; and the inventive method (and apparatus for practicing the method) can be used at more than only a single facility.

While the above description contains many specifics, these should not be construed as limitations on the scope of the invention, but rather as an example of the embodiments thereof. This is true of the method, as pointed out above, and also the applications of the method, as the invention may be used as macrofouling control in the following applications as well: ballast water of ships; hydro plants; lock and dam structures; aquaculture facilities; water utilities; steel companies; oil refineries; pumping and screening stations of aquaculture and levee-drainage districts; chemical plants; and any other facilities which may be subject to macrofouling. Several of these applications (e.g., treating ships' ballast water) are intended to control the spread of macrofouling organisms as well as to control the actual macrofouling infestations.

Further, as noted above, the inventive method has application not only to zebra mussels, but to various fouling organisms, including but not limited to: other mussel species; clams; barnacles; oysters, coelenterates; bryozoans; tube worms; and various slime-forming organisms (bacteria, diatoms, algae and protozoa). Accordingly, upon reading this disclosure, numerous embodiments and applications of the invention will be obvious to one of ordinary skill in the art.

What is claimed is:

1. A method for treating macroinvertebrate infestations in service water systems while maintaining the normal operational flow of water therethrough and without diverting the water therefrom, comprising the steps of:

raising the temperature of water in a treatment area in a service water system to an elevated temperature using a heater located within the service water system, said treatment area being infested with a plurality of macroinvertebrates, said water being heated as it flows in the direction of its normal operational flow past said heater;

maintaining said elevated temperature in said treatment area for a period of time sufficient to achieve mortality of a substantial portion of said macroinvertebrates.

2. The method for treating macroinvertebrate infestations in service water systems claimed in claim 1 wherein said step of raising said temperature of said water comprises injecting steam into said water flow at a point upstream from said treatment area to heat said water.

3. The method for treating macroinvertebrate infestation in water environments of claim 2 wherein said period of time is equal to or greater than a time defined by the intersection of said elevated temperature with a 100% mortality curve for said treatment area.

4. A method for treating macroinvertebrate infestations in water environments comprising the steps of:
- selecting a water treatment area comprising a portion of a non-reversible-flow water system, said treatment area being infested with a plurality of macroinvertebrates;
- isolating said treatment area from fluid communication with adjacent areas;
- raising the temperature of the water in said treatment area to an elevated temperature;
- maintaining said elevated temperature for a period of time sufficient to achieve mortality of a substantial portion of said macroinvertebrates;
- restoring said fluid communication between said treatment area and said adjacent areas; and
- dividing a water mass in the treatment area into a non-contacting water mass and a contacting water mass by placing a barrier therebetween and wherein said step of raising said temperature of said water in said treatment area comprises raising the temperature of only said contacting water mass.

5. A method for treating macroinvertebrate infestations in water environments comprising the steps of:
- selecting a water treatment area comprising a portion of a non-reversible-flow water system, said treatment area being infested with a plurality of macroinvertebrates;
- isolating said treatment area from fluid communication with adjacent areas;
- raising the temperature of the water in said treatment area to an elevated temperature by replacing said water with a volume of preheated water and heating the resulting mass of water;
- maintaining said elevated temperature for a period of time sufficient to achieve mortality of a substantial portion of said macroinvertebrates; and
- restoring said fluid communication between said treatment area and said adjacent areas.

6. A method for treating macroinvertebrate infestations in water environments comprising the steps of:
- selecting a water treatment area comprising a portion of a non-reversible-flow water system, said treatment area being infested with a plurality of macroinvertebrates;
- isolating said treatment area from fluid communication with adjacent areas;
- raising the temperature of the water in said treatment area to an elevated temperature by adding a volume of preheated water to said water already present in said treatment area and heating the resulting mass of water;
- maintaining said elevated temperature for a period of time sufficient to achieve mortality of a substantial portion of said macroinvertebrates; and
- restoring said fluid communication between said treatment area and said adjacent areas.

7. A method for treating macroinvertebrate infestations in water environments comprising the steps of:
- selecting a water treatment area comprising a portion of a non-reversible-flow water system, said treatment area being infested with a plurality of macroinvertebrates;
- isolating said treatment area from fluid communication with adjacent areas;
- raising the temperature of the water in said treatment area to an elevated temperature;
- maintaining said elevated temperature for a period of time sufficient to achieve mortality of a substantial portion of said macroinvertebrates;
- restoring said fluid communication between said treatment area and said adjacent areas; and
- reducing said temperature of said water to ambient, wherein said temperature reduction step follows said temperature maintenance step and precedes said communication restoration step and is accomplished by introducing water at ambient temperature into the treatment area.

8. A method for treating macroinvertebrate infestations in water environments comprising the steps of:
- selecting a water treatment area comprising a portion of a non-reversible-flow water system, said treatment area being infested with a plurality of macroinvertebrates;
- isolating said treatment area from fluid communication with adjacent areas;
- raising the temperature of the water in said treatment area to an elevated temperature;
- maintaining said elevated temperature for a period of time sufficient to achieve mortality of a substantial portion of said macroinvertebrates;
- restoring said fluid communication between said treatment area and said adjacent areas; and
- reducing said temperature of said water to ambient wherein said temperature reduction step follows said temperature maintenance step and precedes said communication restoration step and is accomplished by restoring partial fluid communication between said treatment area and said adjacent areas and diffusing said water having said elevated temperature into said surrounding areas adjacent to said treatment area.

* * * * *